(12) United States Patent
Fan et al.

(10) Patent No.: US 12,265,217 B2
(45) Date of Patent: Apr. 1, 2025

(54) DISPLAY DEVICE AND GLASSES

(71) Applicant: Jiaxing UPhoton Optoelectronics Technology Co., Ltd., Jiaxing (CN)

(72) Inventors: Zhentao Fan, Jiaxing (CN); Qingfeng Zhu, Jiaxing (CN); Lei Sui, Jiaxing (CN); Kehan Tian, Jiaxing (CN)

(73) Assignee: JIAXING UPHOTON OPTOELECTRONICS TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/609,094

(22) Filed: Mar. 19, 2024

(65) Prior Publication Data

US 2024/0411128 A1 Dec. 12, 2024

(30) Foreign Application Priority Data

Jun. 8, 2023 (CN) .......................... 202310674050.7

(51) Int. Cl.
| | |
|---|---|
| G02B 27/00 | (2006.01) |
| F21V 8/00 | (2006.01) |
| G02B 27/01 | (2006.01) |

(52) U.S. Cl.
CPC ....... *G02B 27/0093* (2013.01); *G02B 6/0016* (2013.01); *G02B 6/0035* (2013.01);
(Continued)

(58) Field of Classification Search
CPC ............ G02B 27/0093; G02B 6/0016; G02B 6/0035; G02B 6/0068; G02B 27/0172;
(Continued)

(56) References Cited

U.S. PATENT DOCUMENTS

2015/0138451 A1  5/2015 Amitai

FOREIGN PATENT DOCUMENTS

| CN | 104199196 A | 12/2014 |
|---|---|---|
| CN | 107783297 A | 3/2018 |

(Continued)

OTHER PUBLICATIONS

English translation of Notice of Grant of Patent Right for Invention for priority Chinese Patent Application No. 202310674050.7 dated Jul. 10, 2023.

(Continued)

*Primary Examiner* — Henry Duong
(74) *Attorney, Agent, or Firm* — Renner, Kenner, Greive, Bobak, Taylor & Weber (57) ABSTRACT

The present application provides a display device and glasses. The display device includes an optical waveguide, a first and second projectors, at least one optical sensing assembly, and a feedback tracking device. The first and second projectors respectively project a first light with a wavelength of visible light wavelength and a second light with a wavelength of second wavelength to a coupling-in device. The optical sensing assembly is arranged corresponding to a coupling-out device, and includes at least one imaging device. The feedback tracking device is electrically connected to the first projector and the light sensing assembly. The optical sensing assembly is used for receiving the second light reflected by human eye. The feedback tracking device adjusts the first projector according to the second light received by the optical sensing assembly such that the first light coupled out of the coupling-out device follows a line of sight of human eye.

24 Claims, 5 Drawing Sheets

(52) U.S. Cl.
CPC ........ *G02B 6/0068* (2013.01); *G02B 27/0172* (2013.01); *G02B 27/0179* (2013.01); *G02B 6/003* (2013.01); *G02B 2027/0138* (2013.01); *G02B 2027/0178* (2013.01); *G02B 2027/0187* (2013.01)

(58) Field of Classification Search
CPC ............... G02B 27/0179; G02B 6/003; G02B 2027/0138; G02B 2027/0178; G02B 2027/0187; G02B 27/01; G02B 27/0101; G02B 27/0103; G02B 27/0149; G02B 27/017; G02B 27/0176; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/019; G02B 2027/0192; G02B 2027/0194; G02B 2027/0196; G02B 2027/0198
USPC .......................................... 359/630
See application file for complete search history.

(56) References Cited

FOREIGN PATENT DOCUMENTS

| CN | 111142255 | A |   | 5/2020 |
|----|-----------|---|---|--------|
| CN | 211086805 | U |   | 7/2020 |
| CN | 114063292 | A |   | 2/2022 |
| CN | 114527573 | A | * | 5/2022 |
| CN | 114839779 | A |   | 8/2022 |

OTHER PUBLICATIONS

Notice of Grant of Patent Right for Invention for priority Chinese Patent Application No. 202310674050.7 dated Jul. 10, 2023 (in Chinese).

* cited by examiner

DISPLAY DEVICE AND GLASSES

CROSS-REFERENCE TO RELATED APPLICATION

The present application claims priority to Chinese Patent Application No. 202310674050.7, filed on Jun. 8, 2023, which is hereby incorporated by reference in its entirety.

BACKGROUND

The present application generally relates to the technical field of optics, and more specifically to a display device and glasses.

With the development of science and technology, Augmented Reality (AR) technology, as a very intelligent and portable display technology, is slowly coming to the public. The main feature of this technology is to superimpose virtual pictures on the real scene, such that people can watch the real scene while viewing the virtual pictures.

An augmented reality display device based on optical waveguide has a coupling-in device and a coupling-out device, wherein the coupling-in device couples the incident light carrying image information into a waveguide substrate. The coupling-out device propagates and expands the light carrying the image information, and at the same time couples the light out of the waveguide substrate to form a coupling-out light field. The eye receives the light from the coupling-out light field such that, for example, the image carried by the incident light can be observed.

In a similar display device, an eye tracking system may be added. The eye tracking system collects images such as the iris, the pupil, the retina of the eye through an imaging device to calculate the visual center point, thereby obtaining the gaze direction of eyeballs, and then feeding back to an image projection device to present the projected image at a position centered on the gaze direction of eyeballs, and to achieve the effect of keeping the projected image at the center of eyeballs gaze in real time.

At present, the display device with eye tracking function is relatively complex in structure, and the imaging effect needs to be improved. Therefore, it is necessary to improve the traditional display device to solve at least one technical problem.

SUMMARY

A series of concepts in simplified form are introduced into the portion of Summary, which will be further illustrated in the portion of the detailed description. The Summary of the present application does not mean attempting to define the key features and essential technical features of the claimed technical solution, let alone determining the protection scope thereof.

In order to at least partially solve the above problems, the first aspect of the present application provides a display device, comprising:

an optical waveguide comprising a waveguide substrate, a coupling-in device and at least one coupling-out device, the coupling-in device and the coupling-out device being arranged on the waveguide substrate along a length direction of the waveguide substrate;

a first projector configured to project a first light with a wavelength of visible light wavelength to the coupling-in device;

a second projector configured to project a second light with a wavelength of second wavelength to the coupling-in device;

at least one light sensing assembly arranged corresponding to the coupling-out device, the light sensing assembly comprising at least one imaging device; and a feedback tracking device electrically connected to the first projector and the light sensing assembly, respectively, wherein the coupling-in device is used for coupling the first light and the second light into the waveguide substrate; the coupling-out device is used for coupling the first light and the second light at least partially out of the waveguide substrate to a human eye; the at least one light sensing assembly is used for receiving the second light reflected by the human eye; and the feedback tracking device is used for adjusting the first projector according to the second light received by the light sensing assembly such that the first light coupled out of the coupling-out device follows a line of sight of the human eye.

The display device according to the present application can present the augmented reality display effect of eye tracking function. The coupling-in device may be simultaneously used for coupling the first light with the visible light wavelength and the second light with a wavelength of the second wavelength into the waveguide substrate, and the coupling-out device may be simultaneously used for coupling the first light and the second light out of the waveguide substrate. That is, the first light and the second light can share a set of waveguide coupling system to achieve coupling-in, coupling-out and expanded light splitting. The second projector in the display device of the present application is used as an eyeball lighting source for eye tracking. The illumination light is more uniform after splitting and coupling through the waveguide, and the eyeball image collected by the imaging device is of better quality. Therefore, the display device of the present application has a simple structure, low cost and good eyeball imaging effect.

Optionally, the first projector and the second projector are respectively disposed on both sides of the waveguide substrate along a thickness direction; or the first projector and the second projector are simultaneously disposed on a same side of the waveguide substrate along a thickness direction.

According to the present application, the first and second projectors are arranged flexibly, which may be either on the same side of the waveguide substrate or on the opposite side of the waveguide substrate.

Optionally, the coupling-in device comprises a first coupling-in grating and a second coupling-in grating that have the same period and are arranged along a width direction of the waveguide substrate, and the display device is configured such that the first light is projected to the first coupling-in grating and the second light is projected to the second coupling-in grating; or the coupling-in device comprises a third coupling-in grating, and both the first light and the second light are projected to the third coupling-in grating.

According to the present application, the coupling-in device may be one grating or two different gratings. When the coupling-in device is one grating, the first light and the second light share the same coupling-in grating, whose structure is simple. When the coupling-in device is two gratings, the two gratings may be configured as a structure suitable for the first light and the second light respectively, such that the diffraction efficiency of the first light and the second light is higher. The first coupling-in grating and the second coupling-in grating have the same period and are arranged along the width direction of the waveguide substrate, such that after the first light and the second light are respectively incident to the coupling-in grating and diffracted and split, they can share the same coupling-out grating to be coupled out, thereby making the structure of the display device simple.

Optionally, the first projector and the second projector are respectively disposed on both sides of the waveguide substrate along a thickness direction, and the coupling-in device is configured as a third coupling-in grating, wherein the third coupling-in grating is used for transmissively diffracting one of the first light and the second light and reflectively diffracting the other of the first light and the second light.

According to the present application, the first projector and the second projector are respectively disposed on both sides of the waveguide substrate along the thickness direction. The first light and the second light can share the same coupling-in grating, which may make the display device simple in structure, easy to manufacture, and low in cost.

Optionally, the optical waveguide comprises two coupling-out devices, namely a first coupling-out device and a second coupling-out device, and the coupling-in device is disposed in a middle position of the first coupling-out device and the second coupling-out device along the length direction of the waveguide substrate;

the second projector is configured to project two beams of the second light in different directions to the coupling-in device such that the two beams of the second light are coupled out to the human eye through the first coupling-out device and the second coupling-out device, respectively.

According to the present application, binocular illumination can be achieved by using one projector. The coupling-in device is disposed in the middle of the first coupling-out device and the second coupling-out device along the length direction of the waveguide substrate, and the coupling-in device splits light to both sides, so that both eyes can observe the image of the first light and can be illuminated by the second light. The second projector projects two beams of the second light in different directions to the coupling-in device. The use of one second projector can make both eyes illuminated and the structural design of the display device simple.

Optionally, the first projector and the second projector are respectively disposed on both sides of the waveguide substrate along a thickness direction, and the coupling-in device is configured as a third coupling-in grating, wherein the third coupling-in grating is used for transmissively diffracting one of the first light and the second light and reflectively diffracting the other of the first light and the second light.

According to the present application, in a display device capable of binocular observation, the first projector and the second projector are arranged on different sides of the waveguide substrate, and can share the same coupling-in grating to diffract the projected light to the coupling-out device, such that both eyeballs can observe the image while can be illuminated by the projected light for eye tracking. Compared with the case where the first and second projectors are disposed on the same side of the waveguide substrate, the area of the coupling-in grating may be reduced.

Optionally, the display device is configured such that the two beams of the second light projected to the third coupling-in grating have an equal incidence angle.

According to the present application, the incidence angles of the two beams of the second light projected to the coupling-in grating are equal, which may make the grating design simple and the exit angle of light coupled out of the optical waveguide the same.

Optionally, the display device is configured such that the third coupling-in grating has a same efficiency of diffracting and splitting light to both sides.

According to the present application, the light received by both eyes has the same intensity.

Optionally, the third coupling-in grating has a symmetrical structure.

According to the present application, the third coupling-in grating has the symmetrical structure such that the third coupling-in grating has the same efficiency of diffracting and splitting light to both sides, and the two coupling-out devices may be disposed symmetrically.

Optionally, a surface of the third coupling-in grating is constructed with a coating film.

According to the present application, the diffraction efficiency may be improved by coating the grating surface.

Optionally, the second projector comprises two light sources for projecting two beams of the second light in different directions to the coupling-in device.

According to the present application, the second projector projects two beams of the second light in different directions to the coupling-in device. Using one second projector can make both eyes illuminated.

Optionally, the second projector comprises:
a substrate;
a first light source arranged on the substrate for emitting a first beam of the second light, the first light source comprising a plurality of first sub-light sources; and
a second light source arranged on the substrate for emitting a second beam of the second light, the second light source comprising a plurality of second sub-light sources,
wherein, the first light source and the second light source are disposed at intervals on the substrate.

According to the present application, the second projector uses two light sources to respectively set different incident directions, so that both eyes can be illuminated. With the light source array composed of the sub-light source as a light source, the light intensity requirements for the sub-light source are relatively low.

Optionally, the first light source and/or the second light source are configured as a Vertical-Cavity Surface-Emitting Laser array.

According to the present application, the use of the Vertical-Cavity Surface-Emitting Laser array as the light source is relatively insensitive to temperature change and has a long expected working life, and the method of configuring the light source is simple.

Optionally, the light source is configured as a laser light source.

According to the present application, the light projected by the light source has good directivity and high brightness.

Optionally, the light sensing assembly comprises a plurality of the imaging devices disposed at intervals.

According to the present application, the light reflected by the eyeball may be obtained from multiple angles, and the tracking effect on the eyeball is better.

Optionally, the second light is configured as infrared light.

According to the present application, eye tracking uses infrared light to illuminate the human eye, which will not affect the human eye's viewing of visible light images and will not harm the human eye.

Optionally, the coupling-out device is a two-dimensional grating; or the coupling-out device comprises a first grating and a second grating, the first grating and the coupling-in device are arranged along the length direction of the waveguide substrate, and the first grating and the second grating are arranged along a width direction of the waveguide substrate, wherein the first grating is a one-dimensional grating for diffracting the first light and the second light into the second grating, and the second grating is a one-dimensional grating for diffracting the first light and the second light out of the waveguide substrate to the human eye.

According to the present application, the coupling-out device may be a two-dimensional grating to expand the range of the coupling-out beam in two dimensions, or the same effect may be achieved by providing two one-dimensional gratings.

Optionally, the coupling-out device is used for directly coupling the first light and the second light coupled into the waveguide substrate by the coupling-in device out of the waveguide substrate; or the coupling-out device comprises a turning grating and a coupling-out grating, wherein the coupling-out grating is used for coupling the first light and the second light propagated via the turning grating and coupled into the waveguide substrate by the coupling-in device out of the waveguide substrate.

According to the present application, the coupling-out device may use one grating to achieve two-dimensional expansion, or may also use a turning grating and another grating to achieve the same effect.

Optionally, the first projector and/or the second projector comprise a collimating lens.

According to the present application, the beam projected by the projector into the coupling-in grating through the collimating lens has a better directivity.

Optionally, the display device is either an augmented reality display device or a virtual reality display device.

The display device according to the present application may be used for, for example, AR glasses.

Optionally, the feedback tracking device is configured to adjust the first projector according to the second light received by the light sensing assembly such that an incidence angle of the first light projected by the first projector with respect to the coupling-in device changes so that the first light coupled out of the coupling-out device follows the line of sight of the human eye.

According to the present application, the feedback tracking device may adjust the angle of the projected light of the first projector depending on the second light reflected by the human eye and received by the light sensing assembly, such that the first light coupled out by the coupling-out device follows the line of sight of the human eye, that is, when the eyeball rotates, the image observed by the human eye is still located at the center of the line-of-sight direction.

Optionally, the coupling-in device is configured as a coupling-in grating, and the display device is configured such that an incidence angle of the second light projected by the second projector to the coupling-in grating is greater than 6°.

According to the present application, when the incidence angle of the second light is greater than 6°, there is a relatively dense distribution of coupling-out light spots and thereby there is a uniform lighting effect.

Optionally, the display device is configured such that the incidence angle of the second light projected by the second projector to the coupling-in grating is greater than 20°.

According to this application, when the incidence angle of the second light is greater than 20°, there is a denser distribution of coupling-out light spots and a more uniform lighting effect.

A second aspect of the present application further provides glasses, comprising:
the display device of the aforementioned technical solution;
a lens; and
a frame for holding the lens near eyes,
wherein the optical waveguide is embedded into the lens.

According to the glasses of the present application, one second projector is used to share a set of coupling-in and coupling-out system with the first projector that projects visible light, which can realize binocular illumination, carry out eye tracking, and present augmented reality display effect. The structure is simple; the cost is low; and the eyeball imaging effect is good.

BRIEF DESCRIPTION OF THE DRAWINGS

The following drawings are hereby incorporated as part of the present application for the understanding of the present application. The embodiments are illustrated and described in the drawings in order to explain the principles of the present application.

EXPLANATION OF REFERENCE NUMERALS

100/200/300: Display device
10/110/210/310: Optical waveguide
11/12: Waveguide substrate
20: Coupling-in device
21: First coupling-in grating
22: Second coupling-in grating
23: Third coupling-in grating
30: Coupling-out device
31: First coupling-out device
32: Second coupling-out device
33: First grating
34: Second grating
350: Glasses
351: Lens
352: Frame
40: First projector
41: Collimating lens
50: Second projector
51: Collimating lens
52: Light source
52A: First light source
52B: Second light source
53A: First sub-light source
53B: Second sub-light source
54: Substrate
60: Light sensing assembly
61: First light sensing assembly
62: Second light sensing assembly
63: Imaging device
70: Human eye
D1: Length direction of waveguide substrate
D2: Width direction of waveguide substrate
D3: Thickness direction of waveguide substrate
L1: Incident light of second light
L2: Coupling-out light of second light
L3: Receiving light of light sensing assembly
80: Feedback tracking device

DETAILED DESCRIPTION

In the following description, numerous specific details are set forth in order to provide a more thorough understanding of the present application. However, it is obvious to those skilled in this art that the present application may be implemented without one or more of these details. In other examples, some technical features well-known in this art are not described in order to avoid confusion with the present application.

In order to understand the present application thoroughly, a detailed description will be provided in the following description. It should be understood that these embodiments are provided to make the disclosure of this application thorough and complete, and that the ideas of these exemplary embodiments are fully conveyed to those of ordinary skill in the art. Obviously, the implementation of the embodiments of the present application is not limited to the specific details familiar to those skilled in the art. The preferred embodiments of the present application are described in detail as follows. However, in addition to these detailed descriptions, the present application may have other embodiments.

Ordinals such as "first" and "second" quoted in this application are merely identifiers and do not have any other meaning, such as a specific order. Moreover, for example, the term "first component" itself does not imply the presence of "second component", and the term "second component" itself does not imply the presence of "first component". The use of the words "first", "second" and "third" does not indicate any order, and these words may be construed as names.

It should be noted that the terms "up", "down", "front", "back", "left", "right", "inside", "outside" and similar expressions used herein are for illustrative purposes only and are not restrictive.

A first aspect of the present application provides a display device capable of presenting an augmented reality display effect of eye tracking. Visible light and illumination light used for eye tracking share a set of coupling system to achieve coupling-in, coupling-out and spreading spectroscopy.

Now, the exemplary embodiments according to the present application will be described in more details with reference to the accompanying drawings.

Figure 1:
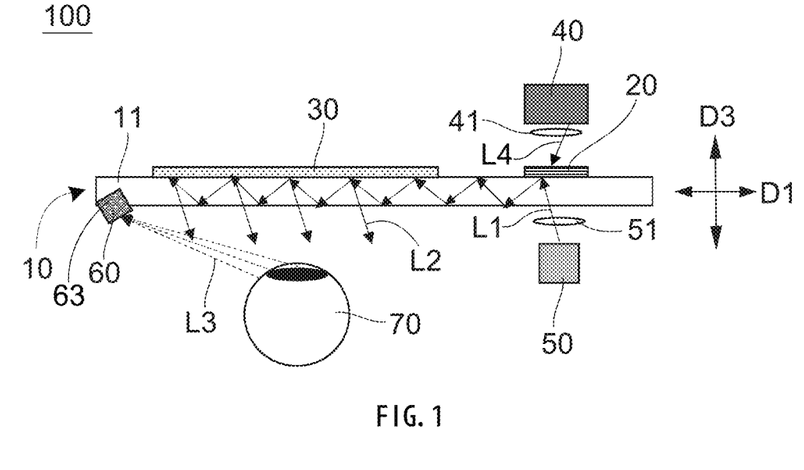
FIG. 1 is a top schematic view of a display device according to a first embodiment of the present application.

As shown in FIG. 1, the display device 100 of the first embodiment comprises an optical waveguide 10, a first projector 40, a second projector 50, a light sensing assembly 60 and a feedback tracking device 80. The optical waveguide 10 comprises a waveguide substrate 11, a coupling-in device 20, and at least one coupling-out device 30. The coupling-in device 20 and the coupling-out device 30 are arranged on the waveguide substrate 11 along the length direction D1 of the waveguide substrate 11. The first projector 40 is used to project a first light with a wavelength of visible light wavelength (e.g., light L4 in FIG. 1) to the coupling-in device 20, and the second projector 50 is used to project a second light with a wavelength of second wavelength to the coupling in device 20 (e.g., light L1 in FIG. 1). The light sensing assembly 60 is arranged corresponding to the coupling-out device 30, and comprises at least one imaging device 63. The optical waveguide 10 as shown in FIG. 1 comprises one coupling-out device 30 and one light sensing assembly 60. When the optical waveguide 10 comprises two coupling-out devices 30, the display device 100 includes two light sensing assemblies 60. The coupling-in device 20 is used for coupling the first light and the second light into the waveguide substrate 11. The coupling-out device 30 is used for coupling the first light and the second light at least partially out of the waveguide substrate 11 to a human eye 70 (e.g., light L2 in FIG. 1). The light sensing assembly 60 is used for receiving the second light reflected by the human eye 70 (e.g., light L3 in FIG. 1). The feedback tracking device 80 are electrically connected to the first projector 40 and the light sensing assembly 60 respectively, for adjusting the first projector 40 according to the second light received by the light sensing assembly 60, such that the first light coupled out of the coupling-out device 30 follows the line of sight of the human eye.

According to the display device 100 of the present application, the coupling-in device 20 can be simultaneously used for coupling the first light with the wavelength of visible light wavelength and the second light with the wavelength of the second wavelength into the waveguide substrate 11, and the coupling-out device 30 can be simultaneously used for coupling the first light and the second light out of the waveguide substrate 11. The first light and the second light share a set of waveguide coupling system to perform coupling-in, coupling-out and spreading spectroscopy while achieve projection of image light and projection of eye tracking illumination light, and the display function of eye tracking is realized under the action of the feedback tracking device 80. Moreover, the illumination light is more uniform after splitting and coupling out through the waveguide, and the eyeball image collected by the imaging device 63 is of better quality. The display device 100 has a simple structure, low cost and good eyeball imaging effect.

Optionally, the second light is configured as infrared light, which will not affect the human eye's viewing of visible light images and will not harm the human eye.

Figure 11:
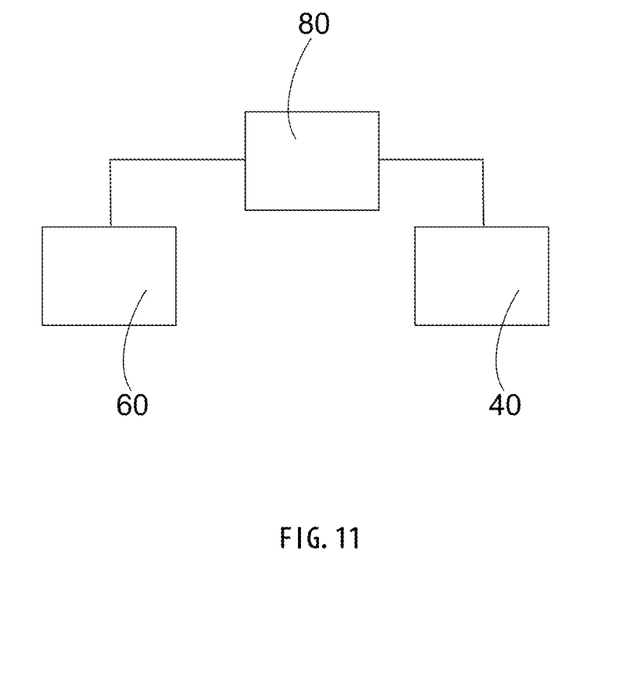
FIG. 11 is a schematic block diagram of an electrical connection between a feedback tracking device, a first projector and a light sensing assembly of the display device according to a specific embodiment of the present application.

The feedback tracking device 80 can analyze the movement of the eyeball (line of sight) from the image acquired by the light sensing assembly 60. Optionally, the light sensing assembly 60 comprises a plurality of imaging devices 63 (such as an infrared camera) arranged at intervals, each for receiving the second light reflected by the human eye at different positions. Therefore, the feedback tracking device 80 can comprehensively determine the movement of the eyeball through multiple images of the second light reflected by the human eye, so as to make the effect of eyeball tracking better. Multiple imaging devices 63 may, for example, be evenly distributed around the human eye 70. It can be understood that the imaging device 63 is disposed at a position where the human eye 70 is not prevented from observing the first light.

Optionally, the feedback tracking device 80 is configured to adjust the first projector 40 according to the second light received by the light sensing assembly 60, such that the incidence angle of the first light projected by the first projector 40 with respect to the coupling-in device 20 changes so that the first light coupled out of the coupling-out device 30 follows the line of sight of the human eye 70. When the incidence angle of the first light with respect to the coupling-in device 20 changes, the angle of the first light coupled out of the coupling-out device 30 changes, such that the first light coupled out of the waveguide substrate 11 can follow the human eye 70.

Optionally, the first projector 40 comprises a collimating lens 41 such that the first light projected to the coupling-in device 20 has good directivity.

Optionally, the second projector 50 comprises a collimating lens 51 such that the second light projected to the coupling-in device 20 has good directivity.

Optionally, the display device 100 is either an augmented reality display device or a virtual reality display device.

Optionally, as shown in FIG. 1, the first projector 40 and the second projector 50 of the display device 100 in the first embodiment are respectively disposed on both sides of the waveguide substrate 11 along the thickness direction D3.

Figure 2:
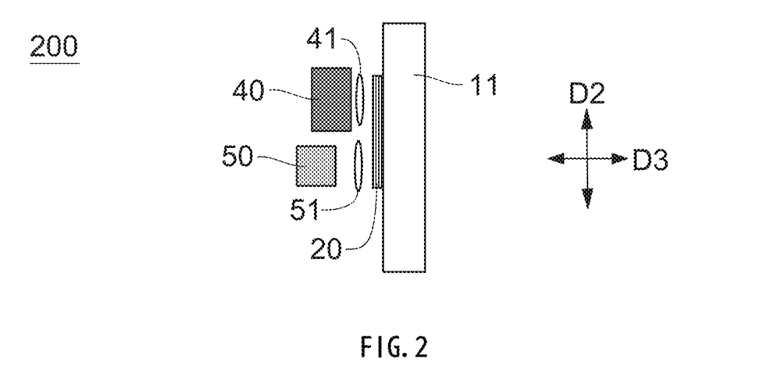
FIG. 2 is a side schematic view of a display device according to a second embodiment of the present application.

As shown in FIG. 2, the first projector 40 and the second projector 50 of the display device 200 in the second embodiment are simultaneously disposed on the same side of the waveguide substrate 11 along the thickness direction D3. The first projector 40 and the second projector 50 are arranged along the width direction D2 of the waveguide substrate 11.

Figure 3:
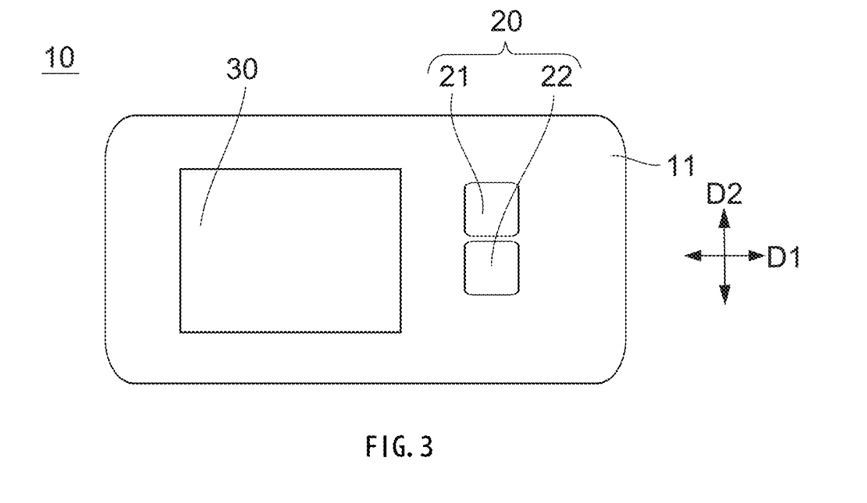
FIG. 3 is a front schematic view of a first example of an optical waveguide of the display device according to a specific embodiment of the present application.

Optionally, as shown in the embodiment of FIG. 3, the coupling-in device 20 of the optical waveguide 10 comprises a first coupling-in grating 21 and a second coupling-in grating 22. The grating vector directions of the first coupling-in grating 21 and the second coupling-in grating 22 are along the length direction D1 of the waveguide substrate 11. The first coupling-in grating 21 and the second coupling-in grating 22 have the same period and are arranged along the width direction D2 of the waveguide substrate 11. The display device is configured such that the first light is projected to the first coupling-in grating 21 and the second light is projected to the second coupling-in grating 22. That is, the first light and the second light respectively use their own coupling-in gratings such that the display device may be designed with a grating structure suitable for the first light and the second light respectively. As such, the diffraction efficiency of the first light and the second light is higher.

Figure 4:
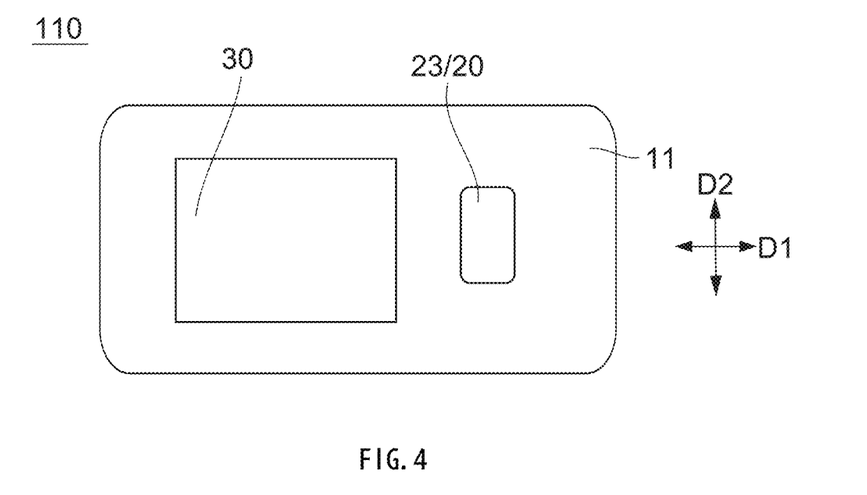
FIG. 4 is a front schematic view of a second example of an optical waveguide of the display device according to a specific embodiment of the present application.

Alternatively, as shown in the embodiment of FIG. 4, a coupling-in device 20 of an optical waveguide 110 comprises a third coupling-in grating 23. A display device 100 or a display device 200 is configured such that both a first light and a second light are projected to the third coupling-in grating 23. That is, the first light and the second light share the same coupling-in grating, such that the display device has a simple structure. Optionally, the first light and the second light are projected to different parts of the third coupling-in grating 23.

Optionally, as shown in the embodiment of FIG. 4, the coupling-out device 30 is used for directly coupling the first light and the second light coupled into the waveguide substrate 11 by the coupling-in device 20 out of the waveguide substrate 11. For example, the coupling-out device 30 is a two-dimensional grating, and performs two-dimensional expanded coupling-out of the first light and the second light at the same time.

Figure 5:
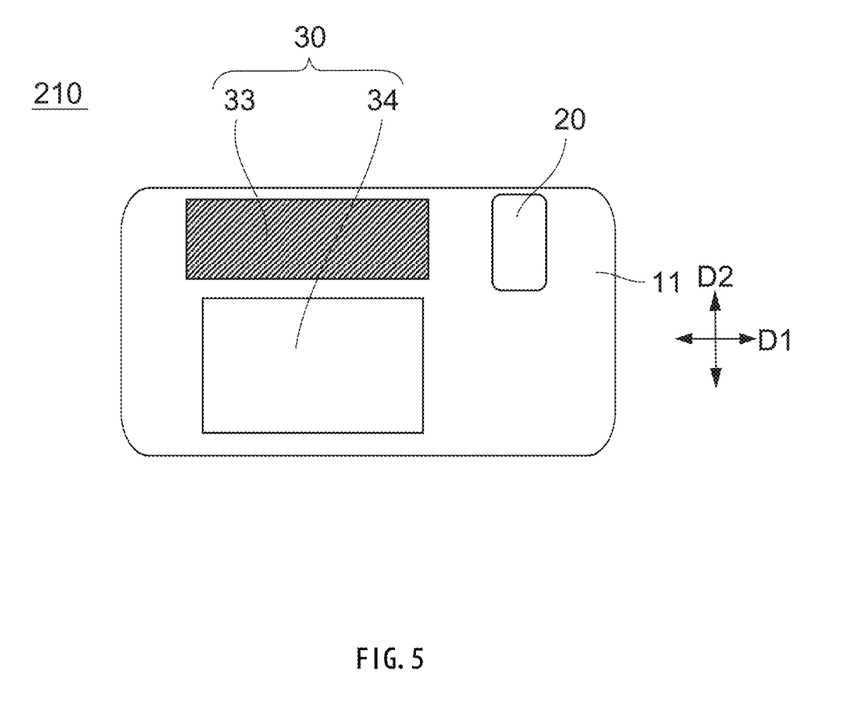
FIG. 5 is a front schematic view of a third example of an optical waveguide of the display device according to a specific embodiment of the present application.

Alternatively, as shown in the embodiment of FIG. 5, a coupling-out device 30 of an optical waveguide 210 comprises a turning grating 33 and a coupling-out grating 34. The coupling-out grating 34 is used for coupling a first light and a second light, which are propagated via the turning grating 33 and are coupled into a waveguide substrate 11 by a coupling-in device 20, out of the waveguide substrate 11. For example, the coupling-out device 30 comprises a first grating 33 (i.e., the turning grating) and a second grating 34 (i.e., the coupling-out grating). The first grating 33 and the coupling-in device 20 are arranged along the length direction D1 of the waveguide substrate 11, and the first grating 33 and the second grating 34 are arranged along the width direction D2 of the waveguide substrate 11. The first grating 33 is a one-dimensional grating for diffracting the first light and the second light into the second grating 34, and the second grating 34 is also a one-dimensional grating for diffracting the first light and the second light out of the waveguide substrate 11 to the human eye.

Optionally, a first projector 40 and a second projector 50 are respectively disposed on both sides of the waveguide substrate 11 along the thickness direction D3. The coupling-in device 20 is configured as a third coupling-in grating 23. As shown in FIG. 1, the third coupling-in grating 23 is used for transmissively diffracting one of the first light and the second light, e.g., the first light, and reflectively diffracting the other of the first light and the second light, e.g., the second light. When the first light and the second light share the coupling-in grating, if the first light and the second light are disposed on the same side of the grating, the coupling-in grating usually needs to have a larger area to receive all the first light and the second light, considering the spatial distribution of the first and second projectors. When the first light and the second light are disposed on both sides of the grating, the area of the grating may be reduced, and the first and second projectors may be disposed more conveniently.

Figure 6:
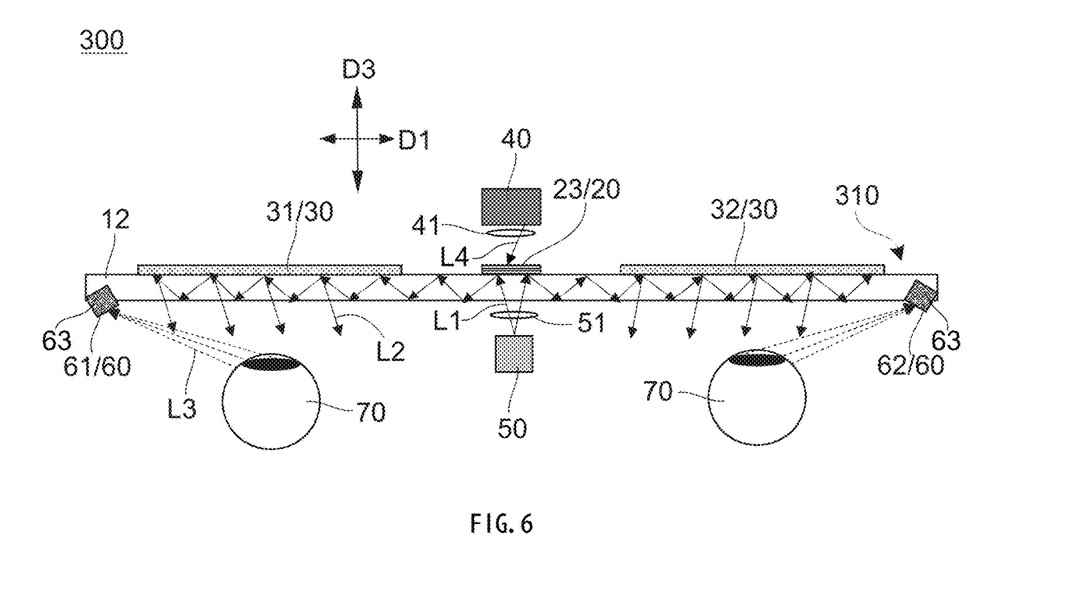
FIG. 6 is a top schematic view of the display device according to the second embodiment of the present application.

In a display device 300 of the third embodiment shown in FIG. 6, an optical waveguide 310 comprises two coupling-out devices 30, namely a first coupling-out device 31 and a second coupling-out device 32, for enabling both eyes to receive the project light. A coupling-in device 20 is disposed in the middle of the first coupling-out device 31 and the second coupling-out device 32 along the length direction D1 of the waveguide substrate 12. For example, the optical waveguide 310 may be set to a symmetrical structure. A second projector 50 is configured to project two beams of a second light in different directions to the coupling-in device 20 such that the two beams of the second light are coupled out to the human eyes 70 through the first coupling-out device 31 and the second coupling-out device 32, respectively.

An light sensing assembly 60 is arranged corresponding to the coupling-out device 30. The display device 300 comprises a first optical sensing assembly 61 arranged corresponding to the first coupling-out device 31 and a second optical sensing assembly 62 arranged corresponding to the second coupling-out device 32. The first optical sensing assembly 61 and the second optical sensing assembly 62 are used to detect the movement of two human eyes 70, respectively.

In the display device 300 of the third embodiment, a first projector 40 and a second projector 50 may also be respectively arranged on both sides of the waveguide substrate 12 along the thickness direction D3, or on the same side of the waveguide substrate 12 along the thickness direction D3, as described above. The coupling-in device 20 may also be configured as described above, including a first coupling-in grating 21 and a second coupling-in grating 22 (The grating vector directions of the first coupling-in grating 21 and the second coupling-in grating 22 are along the length direction D1 of the waveguide substrate 11, such that the diffracting and splitting light directions of the first light and the second light of the coupling-in device 20 are symmetrical on both sides, and both can reach the coupling-out device 30. The first light and the second light may share the coupling-out device 30), or only including the third coupling-in grating 23. The coupling-out device 30 may be configured as described above, including one coupling-out grating, or including one turning grating and one coupling-out grating.

Optionally, in the display device 300, the first projector 40 and the second projector 50 are respectively disposed on both sides of the waveguide substrate 12 along the thickness direction D3. The coupling-in device 20 is configured as the third coupling-in grating 23. The third coupling-in grating 23 is used to transmissively diffract one of the first light and the second light and reflectively diffract the other of the first light and the second light. Accordingly, the first projector 40 and the second projector 50 may share the same coupling-in device and coupling-out device, such that both eyes can observe the image of the first light and can be illuminated by the second light for eye tracking. The display device is simple in structure, simplified in production and low in cost.

Figure 7:
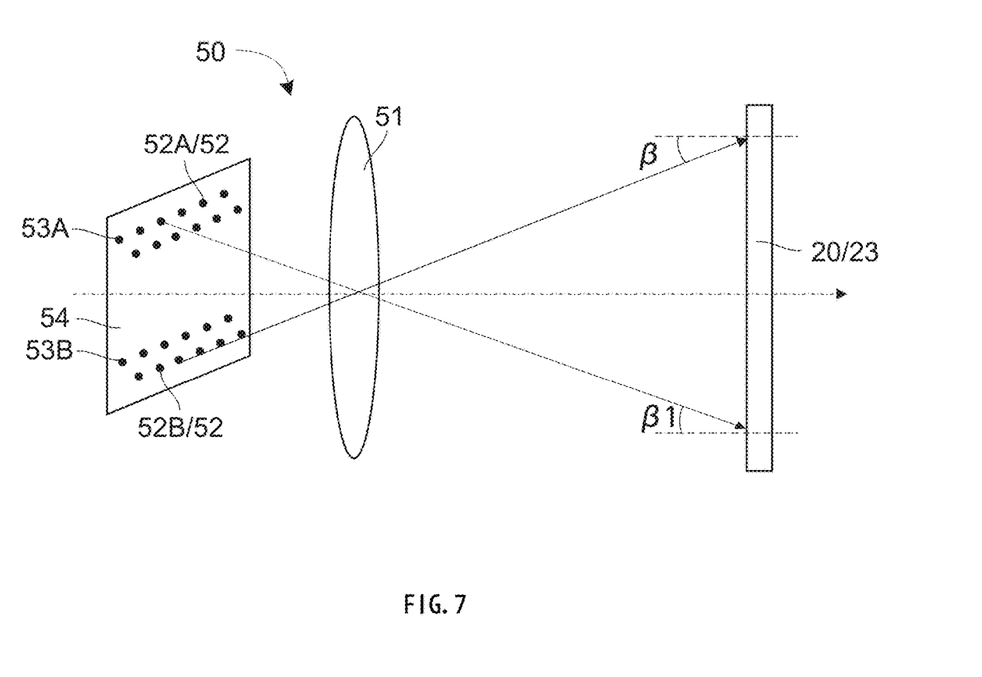
FIG. 7 is a schematic view of a second projector of the display device shown in FIG. 6 projecting a second light.

Optionally, the second projector 50 comprises two light sources 52 for projecting two beams of the second light in different directions to the coupling-in device 20. For example, as shown in FIG. 7, the second projector 50 comprises a substrate 54, a first light source 52A, and a second light source 52B. The first light source 52A is disposed to the substrate 54 for emitting the first beam of the second light. Optionally, the first light source 52A comprises a plurality of first sub-light sources 53A. The second light source 52B may have the same structure as the first light source 52A. The second light source 52B is also disposed to the substrate 54 for emitting the second beam of the second light. Optionally, the second light source 52B comprises a plurality of second sub-light sources 53B. The first light source 52A and the second light source 52B are disposed at intervals on the substrate 54.

As shown in FIG. 7, the incidence angle of the second light emitted by the first light source 52A at the third coupling-in grating 23 is β1, and the incidence angle of the second light emitted by the second light source 52B at the third coupling-in grating 23 is β2. Optionally, the display device 300 is configured such that the two beams of the second light projected to the third coupling-in grating 23 have equal incidence angles β1 and β2.

According to the grating equation $n \cdot \sin\theta = \sin\beta + m \cdot \lambda/d$, where n is the refractive index of the waveguide substrate (for example, between 1.5 and 2.1), θ is the diffraction angle of the m-th order of the third coupling-in grating 23, β is the incidence angle of the second light projected to the third coupling-in grating 23, m is the diffraction order, λ is the wavelength of the second light for eye tracking (for example, between 800 and 1000 nm, which is infrared light), and d is the period of the third coupling-in grating 23 (for example, between 300 and 550 nm). Since the diffraction order propagated in the waveguide has a relatively dense distribution of coupling-out light spots when θ<65°, there is a uniform illumination effect. Therefore, optionally, β<−6° or β>6°, that is, the magnitude of the incidence angle is greater than 6°. Alternatively, <−20° or β>20°, i.e., the magnitude of the incidence angle is greater than 20°.

It can be understood that, in the present application, no matter whether the display device comprises one coupling-out device 30 or two coupling-out devices 30, that is, whether the display device is used for monocular or binocular purposes, optionally, the display device is configured such that the incidence angle β of the second light projected by the second projector 50 to the third coupling-in grating 23 is greater than 6°. Alternatively, the display device is configured such that the incidence angle β of the second light projected by the second projector 50 to the third coupling-in grating 23 is greater than 20°.

Optionally, the light source 52 is configured as a laser light source, such as a Vertical-Cavity Surface-Emitting Laser (VCSEL) or an Edge Emitting Laser (EEL), such that the projected light has good directivity and high brightness.

Optionally, the first light source 52A and/or the second light source 52B are configured as a Vertical-Cavity Surface-Emitting Laser array, which may increase the intensity of light source. That is, each first sub-light source 53A and/or each second sub-light source 53β is a Vertical-Cavity Surface-Emitting Laser. Optionally, the display device 300 is configured such that the third coupling-in grating 23 has the same efficiency of diffracting and splitting light to both sides, so that the light intensity received by both eyes is the same. Optionally, the third coupling-in grating 23 has a symmetrical structure, such as a rectangular grating, a symmetrical trapezoidal grating, a symmetrical step grating, an isosceles triangle grating, etc. Optionally, the surface of the third coupling-in grating 23 is constructed with a coating film to further improve the diffraction efficiency.

Further, the structure of the third coupling-in grating 23 is mainly optimized in design according to the wavelength and incidence angle range of the first light projected by the first projector 40, while taking into account the diffraction efficiency of the second light projected by the second projector 50.

Figure 8:
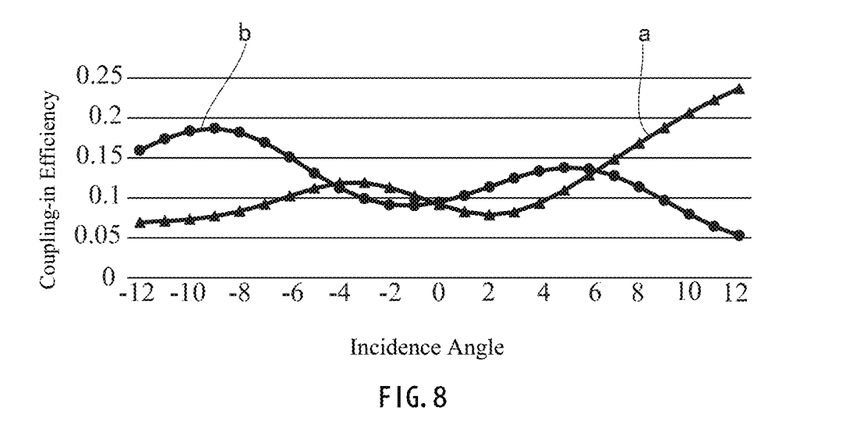
FIG. 8 is a schematic view of the relationship curve between the coupling-in efficiency of a first light and the incidence angle of the first light of the coupling-in device of the display device under different parameters according to a specific embodiment of this application, wherein the parameters of the coupling-in device corresponding to Curve a are 410 nm in depth and 185 nm in width, and the parameters of the coupling-in device corresponding to Curve b are 260 nm in depth and 273 nm in width.
Figure 9:
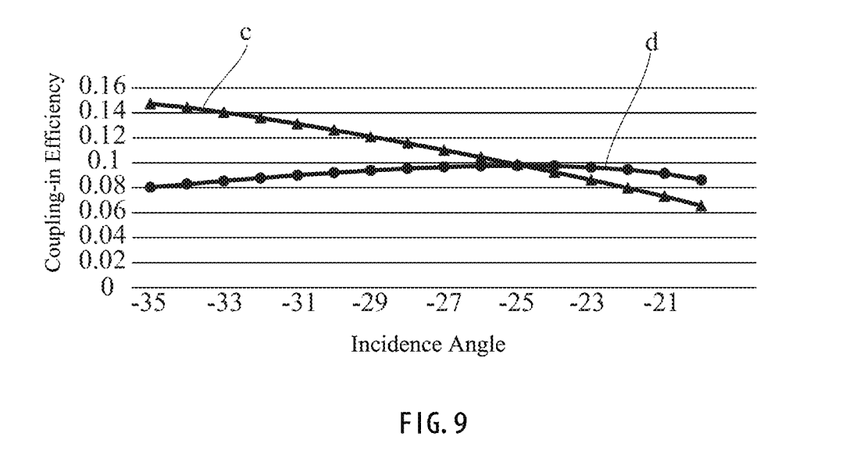
FIG. 9 is a schematic view of the relationship curve between the coupling-in efficiency of the second light and the incidence angle of the second light of the coupling-in device of the display device under the parameters shown in FIG. 8 according to the specific embodiment of this application, wherein the parameters of the coupling-in device corresponding to Curve c are 410 nm in depth and 185 nm in width, and the parameters of the coupling-in device corresponding to Curve d are 260 nm depth and 273 nm width.

Take as an example that the third coupling-in grating 23 is a rectangular grating with a period of 420 nm, the wavelength of the first light projected by the first projector 40 is 530 nm, and the wavelength of the second light is 830 nm. As shown in FIG. 8, when the third coupling-in grating 23 is a rectangular grating with a depth of 410 nm and a width of 185 nm, the first light has an average coupling-in efficiency of 11.9% and a uniformity of 29.2%, with the magnitude of the incidence angle in a range of less than 12° (Curve a). When the third coupling-in grating 23 is a rectangular grating with a depth of 260 nm and a width of 273 nm, the first light has an average coupling-in efficiency of 12.4% and a uniformity of 28.3%, with the magnitude of the incidence angle in a range of less than 12° (Curve b). The two grating structures have close coupling-in efficiency and uniformity of the first light. As shown in FIG. 9, when the third coupling-in grating 23 is a rectangular grating with a depth of 410 nm and a width of 185 nm, the average coupling-in efficiency and uniformity of the second light are 11.1% and 44.5%, respectively (Curve c). When the third coupling-in grating 23 is a rectangular grating with a depth of 260 nm and a width of 273 nm, the average coupling-in efficiency and uniformity of the second light are 9.2% and 82.1%, respectively (Curve d). Therefore, in order to take into account the coupling-in efficiency of the second light, the structure parameters of grating depth of 410 nm and width of 185 nm are selected.

In another specific example of the display device 300 of the first aspect, the wavelength of a first light projected by a first projector 40 is 530 nm. A first coupling-out device 31 and a second coupling-out device 32 are two-dimensional grating and are symmetrically arranged with respect to a coupling-in device 20. The coupling-in device 20 comprises a first coupling-in grating and a second coupling-in grating. The first coupling-in grating is configured to receive the first light, and the second coupling-in grating is configured to receive the second light. The first coupling-in grating and the second coupling-in grating are arranged along the width direction of a waveguide substrate, and the grating vector directions of the first coupling-in grating and the second coupling-in grating are along the length direction (left and right direction) of the waveguide substrate 11. The first coupling-in grating is a wire grating with a period of 420 nm, a grating structure depth of 260 nm and a width of 273 nm. The structure of the first coupling-in grating may make the beam splitting symmetrical to both sides, and has a relatively high coupling-in efficiency (e.g., 11.9%) for visible light with a wavelength of 530 nm. The second projector 50 includes a VCSEL array and a collimating lens, emitting two beams of the second light with a wavelength of 850 nm. The incidence angles of the two beams of the second light in the second coupling-in grating are 20°~35°. The second coupling-in grating is a wire grating with a period of 420 nm, a grating structure depth of 400 nm, and a 70% duty cycle. The structure of the second coupling-in grating can make the beam splitting symmetrical to both sides, and has a relatively high coupling-in efficiency (e.g., 11.5%) for infrared light at 850 nm.

It can be understood that in the display device 300, no matter whether the coupling-in device 20 includes one grating or two gratings, the grating vector directions of all the gratings are parallel to the length direction D1 of the waveguide substrate 12, such that the coupling-in device 20 splits the light to both sides, and the two coupling-out devices 30 both can receive the first light and the second light.

Figure 10:
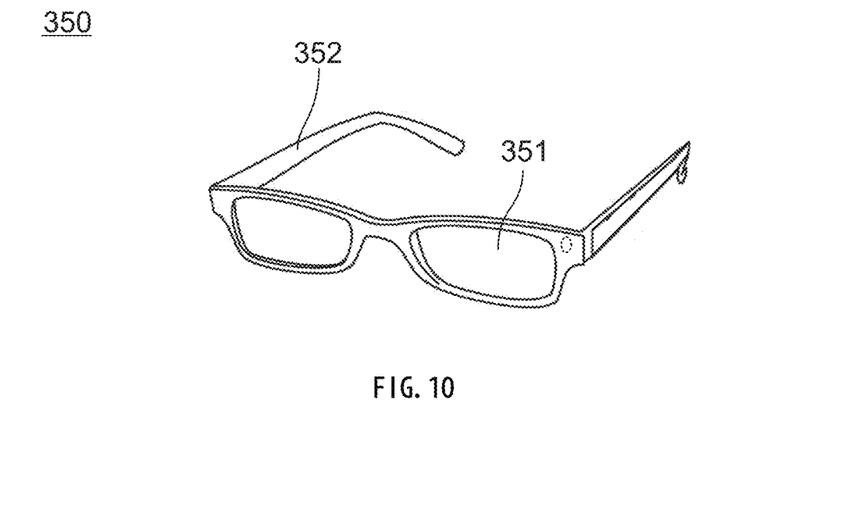
FIG. 10 is a perspective schematic view of the glasses according to a preferred embodiment of the present application.

On the other hand, the present application further provides glasses. As shown in the embodiment of FIG. 10, glasses 350 comprise a lens 351, a frame 352, and the display device (e.g., the display device 300) described in the first aspect The frame 352 is used for holding the lens 351 close to the human eyes, and the optical waveguide of the display device is embedded in the lens 351. The lens 351, for example, are transparent to visible light so as not to hinder the human eye from observing the environment. At the same time, the display device projects the first light (such as a picture) of the first projector from the lens 351 to the human eye, so that the human eye can see the environment and the picture of the first light at the same time, forming the effect of augmented reality display. The display device captures the second light reflected by the human eye through its light sensing assembly, such that the feedback tracking device 80 can analyze the movement of the line of sight. Then, the feedback tracking device 80 adjusts the first projector according to the movement of the human eye, so that the first light emitted from the lens 351 can follow the line of sight of the human eye. Accordingly, the picture of the first light is always in front of the line of sight.

It can be understood that the glasses according to the present application comprises all features and effects of the display device according to the present application.

When understanding the scope of this application, the term "comprising" and its derivatives as used herein are intended to be open-ended terms that specify the presence of stated features, elements, components, groups, wholes and/or steps, but do not preclude the presence of other unstated features, elements, components, groups, wholes and/or steps. This concept also applies to words with similar meanings, such as the terms "including" and "having" and their derivatives.

The term "attached" or "attaching" as used herein includes a configuration of securing an element directly to another element by fixing it directly to another element; a configuration of indirectly securing an element to another element by fixing the element to an intermediate member which is in turn fixed to another element, and a configuration that one element is integrated with another element, that is, one element is essentially a part of another element. This definition also applies to words with similar meanings, such as "connecting", "joining", "coupling", "mounting", "bonding", and "fixing" and their derivatives. Finally, degree terms such as "substantially", "about", and "approximately" used herein represent an amount of deviation of the modified term so that the final result would not be changed significantly.

Unless otherwise defined, the technical and scientific terms used herein have the same meanings as commonly understood by those skilled in the technical field of the present application. The terms used herein are only for the purpose of describing specific implementation, and are not intended to limit the present application. Feature(s) described in one embodiment herein may be applied to another embodiment alone or in combination with other features, unless the feature(s) are not applicable in the other embodiment or stated otherwise.

The present application has been described through the above-mentioned embodiments, but it should be understood that the above-mentioned embodiments are only for the purpose of illustration and description, and are not intended to limit the present application to the scope of the described embodiments. Furthermore, those skilled in the art can understand that the present application is not limited to the above embodiments, and more variations and modifications may be made according to the teachings of the present application. These variations and modifications fall within the protection scope claimed by the present application.

What is claimed is:

1. A display device, comprising:
an optical waveguide comprising a waveguide substrate, a coupling-in device and at least one coupling-out device, the coupling-in device and the coupling-out device being arranged on the waveguide substrate along a length direction of the waveguide substrate;
a first projector configured to project a first light with a wavelength of visible light wavelength to the coupling-in device;
a second projector configured to project a second light with a wavelength of second wavelength to the coupling-in device;
at least one light sensing assembly arranged corresponding to the coupling-out device, the light sensing assembly comprising at least one imaging device; and
a feedback tracking device electrically connected to the first projector and the light sensing assembly, respectively,
wherein the coupling-in device is used for coupling the first light and the second light into the waveguide substrate; the coupling-out device is used for coupling the first light and the second light at least partially out of the waveguide substrate to a human eye; the at least one light sensing assembly is used for receiving the second light reflected by the human eye; and the feedback tracking device is used for adjusting the first projector according to the second light received by the light sensing assembly such that the first light coupled out of the coupling-out device follows a line of sight of the human eye.

2. The display device of claim 1, wherein
the first projector and the second projector are respectively disposed on both sides of the waveguide substrate along a thickness direction; or
the first projector and the second projector are simultaneously disposed on a same side of the waveguide substrate along a thickness direction.

3. The display device of claim 1, wherein
the coupling-in device comprises a first coupling-in grating and a second coupling-in grating that have the same period and are arranged along a width direction of the waveguide substrate, and the display device is configured such that the first light is projected to the first coupling-in grating and the second light is projected to the second coupling-in grating; or
the coupling-in device comprises a third coupling-in grating, and both the first light and the second light are projected to the third coupling-in grating.

4. The display device of claim 1, wherein the first projector and the second projector are respectively disposed on both sides of the waveguide substrate along a thickness direction, and the coupling-in device is configured as a third coupling-in grating, wherein the third coupling-in grating is used for transmissively diffracting one of the first light and the second light and reflectively diffracting the other of the first light and the second light.

5. The display device of claim 1, wherein
the optical waveguide comprises two coupling-out devices, namely a first coupling-out device and a second coupling-out device, and the coupling-in device is disposed in a middle position of the first coupling-out device and the second coupling-out device along the length direction of the waveguide substrate;
the second projector is configured to project two beams of the second light in different directions to the coupling-in device such that the two beams of the second light are coupled out to the human eye through the first coupling-out device and the second coupling-out device, respectively.

6. The display device of claim 5, wherein the first projector and the second projector are respectively disposed on both sides of the waveguide substrate along a thickness direction, and the coupling-in device is configured as a third coupling-in grating, wherein
the third coupling-in grating is used for transmissively diffracting one of the first light and the second light and reflectively diffracting the other of the first light and the second light.

7. The display device of claim 6, wherein the display device is configured such that the two beams of the second light projected to the third coupling-in grating have an equal incidence angle.

8. The display device of claim 6, wherein the display device is configured such that the third coupling-in grating has a same efficiency of diffracting and splitting light to both sides.

9. The display device of claim 8, wherein the third coupling-in grating has a symmetrical structure.

10. The display device of claim 6, wherein a surface of the third coupling-in grating is constructed with a coating film.

11. The display device of claim 5, wherein the second projector comprises two light sources for projecting two beams of the second light in different directions to the coupling-in device.

12. The display device of claim 11, wherein the second projector comprises:
a substrate;
a first light source arranged on the substrate for emitting a first beam of the second light, the first light source comprising a plurality of first sub-light sources; and
a second light source arranged on the substrate for emitting a second beam of the second light, the second light source comprising a plurality of second sub-light sources,
wherein, the first light source and the second light source are disposed at intervals on the substrate.

13. The display device of claim 12, wherein
the first light source and/or the second light source are configured as a Vertical-Cavity Surface-Emitting Laser array.

14. The display device of claim 11, wherein the light source is configured as a laser light source.

15. The display device of claim 1, wherein the light sensing assembly comprises a plurality of the imaging devices disposed at intervals.

16. The display device of claim 1, wherein the second light is configured as infrared light.

17. The display device of claim 1, wherein
the coupling-out device is a two-dimensional grating; or
the coupling-out device comprises a first grating and a second grating, the first grating and the coupling-in device are arranged along the length direction of the waveguide substrate, and the first grating and the second grating are arranged along a width direction of the waveguide substrate, wherein the first grating is a one-dimensional grating for diffracting the first light and the second light into the second grating, and the second grating is a one-dimensional grating for diffracting the first light and the second light out of the waveguide substrate to the human eye.

18. The display device of claim 1, wherein
the coupling-out device is used for directly coupling the first light and the second light coupled into the waveguide substrate by the coupling-in device out of the waveguide substrate; or
the coupling-out device comprises a turning grating and a coupling-out grating, wherein the coupling-out grating is used for coupling the first light and the second light propagated via the turning grating and coupled into the waveguide substrate by the coupling-in device out of the waveguide substrate.

19. The display device of claim 1, wherein the first projector and/or the second projector comprise a collimating lens.

20. The display device of claim 1, wherein the display device is either an augmented reality display device or a virtual reality display device.

21. The display device of claim 1, wherein the feedback tracking device is configured to adjust the first projector according to the second light received by the light sensing assembly such that an incidence angle of the first light projected by the first projector with respect to the coupling-in device changes so that the first light coupled out of the coupling-out device follows the line of sight of the human eye.

22. The display device of claim 1, wherein the coupling-in device is configured as a coupling-in grating, and the display device is configured such that an incidence angle of the second light projected by the second projector to the coupling-in grating is greater than 6°.

23. The display device of claim 22, wherein the display device is configured such that the incidence angle of the second light projected by the second projector to the coupling-in grating is greater than 20°.

24. Glasses, comprising:
the display device of claim 1;
a lens; and
a frame for holding the lens near eyes,
wherein the optical waveguide is embedded into the lens.

* * * * *